United States Patent [19]

Tsukada et al.

[11] Patent Number: 4,649,097

[45] Date of Patent: Mar. 10, 1987

[54] CORONA DISCHARGE APPARATUS AND METHOD FOR CORONA DISCHARGE TREATMENT

[75] Inventors: Satoshi Tsukada; Kazuhisa Taguchi, both of Nagaokakyo, Japan

[73] Assignee: Mitsubishi Paper Mills Ltd., Tokyo, Japan

[21] Appl. No.: 743,779

[22] Filed: Jun. 12, 1985

Related U.S. Application Data

[63] Continuation of Ser. No. 490,112, Apr. 29, 1983, abandoned.

[30] Foreign Application Priority Data

| | | | |
|---|---|---|---|
| May 31, 1982 | [JP] | Japan | 57-92770 |
| Jun. 29, 1982 | [JP] | Japan | 57-112105 |
| Feb. 25, 1983 | [JP] | Japan | 58-27671[U] |

[51] Int. Cl.⁴ .......... G03C 1/76

[52] U.S. Cl. .......... 430/270; 430/532; 430/937; 427/40; 250/326

[58] Field of Search .......... 430/532, 937, 270; 427/40; 361/225, 229, 213; 250/324, 325, 326; 204/165

[56] References Cited

U.S. PATENT DOCUMENTS

| | | | |
|---|---|---|---|
| 3,607,345 | 9/1971 | Thomas et al. | 430/502 |
| 4,227,234 | 10/1980 | Seanor et al. | 361/229 |
| 4,281,247 | 7/1981 | Schuster | 250/324 |
| 4,298,440 | 11/1981 | Hood | 204/165 |

OTHER PUBLICATIONS von der Heide et al, "Guide to Corona Film Treatment", Modern Plastics, May 1961, pp. 199-206, 344.

*Primary Examiner*—John E. Kittle
*Assistant Examiner*—José G. Dees
*Attorney, Agent, or Firm*—Cushman, Darby & Cushman

[57] ABSTRACT

Disclosed is a corona discharge apparatus capable of producing a uniform corona electrical charging which has a discharge electrode and a grounded roller wherein a metal roller clad with an insulating layer of or containing a high-permittivity substance is used as the grounded roller or the discharge electrode in roller form. Excellent durability and physical strength of the roller keeping the advantage of producing uniformly distributed corona charge can be obtained by overlaying said insulating layer with a layer of insulators other than the high-permittivity substance used in the former layer. Further disclosed is a method for corona treatment using said apparatus.

18 Claims, 2 Drawing Figures

CORONA DISCHARGE APPARATUS AND METHOD FOR CORONA DISCHARGE TREATMENT

This is a continuation of application Ser. No. 490,112, filed Apr. 29, 1983, abandoned.

BACKGROUND OF THE INVENTION

This invention relates to a corona discharge apparatus (corona apparatus) and a method for the corona treatment. More particularly, it relates to a corona apparatus and a method for the corona treatment which are suitable for use in hydrophilizing (i.e. imparting hydrophilic properties to) a hydrophobic surface in the case of providing a hydrophilic layer such as a photographic emulsion layer on a support having the hydrophobic surface.

Photosensitive materials are manufactured generally by providing at least one coating layer of a silver halide emulsion on a support. As the supports, there are used, in accordance with the purpose, various materials having a hydrophobic surface, such as polyethylene-coated paper, polyethylene terephthalate film and the like. Because of its hydrophilic nature, a photographic layer does not strongly adhere to a hydrophobic surface, if coated directly thereon. It is a general practice, therefore, to hydrophilize the surface of a hydrophobic support before coating. The hydrophilization is effected by various means including the provision of a subbing layer by coating the support surface with a composition which adheres to both the hydrophobic surface and the hydrophilic coating layer, and the surface treatment such as corona treatment, flame treatment, exposure to ultraviolet rays, or glow-discharge treatment. Among these, in view of the ease of operation, safety and cost, the corona treatment has recently been in wide use, particularly for polyethylene-coated paper.

The corona treatment, however, offers several difficulties. One of the important difficulties associated with the manufacture of photosensitive materials is the occurrence of non-uniformity in photographic coating layer resulting from uneven distribution of the electrical charge which, in turn, is originated in non-uniform discharge. Since the photographic layer is a thin layer of several to several tens microns in thickness, the non-uniform coating severely affects the photographic characteristics, thus deteriorating markedly the photographic products in quality.

The means heretofore proposed for the elimination or diminution of the coating non-uniformity include improvement of the coating composition so as to make it less sensitive to non-uniform corona electrical charging; storage of the corona-treated material for a certain period of time before coating so as to make uniform the distribution of charge; and a D.C.-treatment of the corona-treated material before coating by means of a strong D.C. field so as to make uniform the distribution of charge. The improvement of the coating composition not only accompanied other restrictive conditions but also failed in sufficiently eliminating the coating non-uniformity. The temporary storage before coating of the corona-treated material involved an increase in both the quantity of intermediate products and the number of operation steps, resulting in an increase in cost. The D.C.-treatment revealed a disadvantage of insufficient flattening of the charge distribution.

SUMMARY OF THE INVENTION

An object of this invention is to provide a corona treatment apparatus capable of producing uniform corona electrical charging without accompanying the disadvantages of conventional methods.

Another object of this invention is to provide a method for the corona treatment capable of forming a uniform hydrophilic coating layer on a hydrophobic support having its surface hydrophilized by said corona treatment.

BRIEF DESCRIPTION OF THE DRAWING

In FIGS. 1 and 2, 1 is grounded roller, 2 a core metal roller of the grounded roller, 3 an insulating layer (insulating layer of or containing a high-permittivity according to the present invention), 4 a layer of an insulator substance which is different from the high-permittivity substance used in layer 3; 5 a corona discharge electrode; 6 a web; 7 corona zone.

DESCRIPTION OF THE PREFERRED EMBODIMENT

The objects of this invention are achieved by the use of a corona treatment apparatus comprising a discharge electrode and a grounded roller wherein a metal roller clad with an insulating layer of or containing a high-permittivity material is employed as the grounded roller or as the discharge electrode in roller form. As contrasted with the conventional method, in which a non-uniform distribution of charge produced by the corona treatment is subsequently uniformalized by some means, the method of this invention produces uniform corona discharge which results in uniform distribution of charge. According to this invention, therefore, there is no room for the occurrence of troubles associated with the uniformalization by after-treatment.

Figure 1:
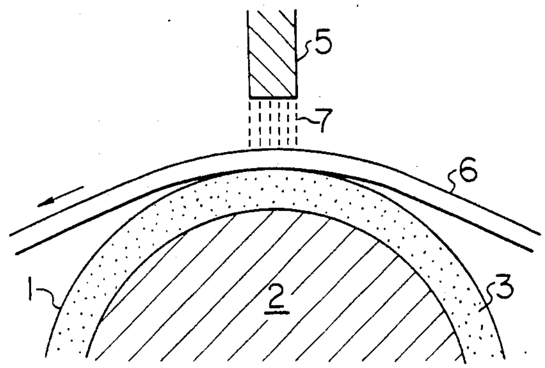
FIGS. 1 and 2 are schematic sectional views of corona treatment apparatuses in operation, treating the surface of a web with corona discharge.

A typical example of an embodiment of this invention is described below with reference to FIG. 1. FIG. 1 is a schematic representation to illustrate the process of treating a moving web surface with corona discharge by use of a discharge apparatus provided with a stationary electrode and a grounded roller. According to this invention, the insulator cladding 3 is made of a high-permittivity substance, or an insulating material containing a high-permittivity substance. In another embodiment of this invention, a roller (not shown in FIG. 1) similar to the grounded roller is used as the corona discharge electrode in place of the electrode 5 of FIG. 1. In such a case the grounded roller may have no insulator cladding 3.

The high-permittivity substances preferred for use in the apparatus of this invention are those having a relative permittivity of 20 or above. Nonlimitative examples of such substances include ceramics such as titanates, e.g., barium titanate (relative permittivity 1150–3200), zirconium titanate (relative permittivity 55), etc. and titanium oxide (relative permittivity 30–90). Of these, barium titanate is most preferred. These ceramics are used in the form of powder or porcelain. The relative permittivity, as herein referred to, is a value as determined at a frequency of 100 KHz. In practicing the present invention, the cladding of a metal roller with only a high-permittivity substance is effected by means of several techniques including flame spraying, though the invention is not limited to any of the cladding techniques. A suitable thickness of the clad layer of a high-permittivity substance is about 0.5 to 5 mm, though not limitative.

In cladding a metal roller with an insulating layer containing a high-permittivity substance, use is generally made of an insulating rubber such as silicone rubber, ethylene-propylene rubber, or "Hypalon" rubber (du. Pont Co.), which has been incorporated with a powdered high-permittivity substance. These rubbers themselves have generally a relative permittivity of about 8 or below. The most preferred among the rubbers is "Hypalon" rubber which has a high relative permittivity. The particle size of a powdered high-permittivity substance is about 50μ or below, preferably 10μ or below. The high-permittivity substance content of the insulating layer is generally about 0.3 to 3 parts by weight for 1 part by weight of the insulating substance such as an insulating rubber. The uniformity of the corona charge distribution is improved with the increase in high-permittivity substance content. However, if the content is too high, the durability of the insulating layer tends to decrease and the dispersion of the high-permittivity substance becomes non-uniform. The suitable content should be selected by taking the above facts into account. The thickness of the insulating layer containing powdered high-permittivity substances is generally about 1 to 10 mm, preferably 2 to 7 mm, though not limitative.

Figure 2:
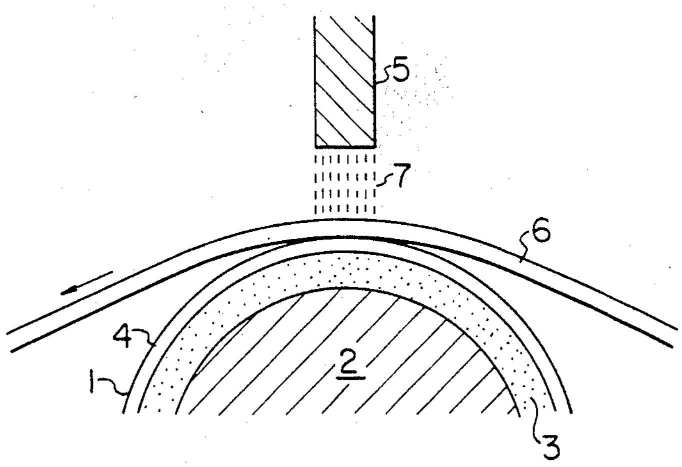

As mentioned hereinbefore, the inclusion of a powdered high-permittivity substance in the insulating layer such as insulating rubber, etc. has disadvantages, as compared with when the substance is not included, in that the insulating layer becomes deteriorated in physical properties and, moreover, the deterioration of the insulating layer is more marked by the exposure to corona discharge, resulting in reduced durability of the roller. Such phenomena become more marked with the increase in high-permittivity substance content. The insulating layer made of a high-permittivity substance alone has also a disadvantage of marked reduction in resistance against an external mechanical impact. The above difficulties, however, can be overcome, as shown in FIG. 2, by overlaying the layer 3 of or containing a high-permittivity substance with a layer 4 of insulators other than the high-permittivity substance used in layer 3, such as, for example, silicone rubber, ethylene-propylene rubber, and "Hypalon" rubber. Such a roller has an excellent durability as well as excellent physical strengths, while the advantage of producing uniformly distributed corona charge being retained. The roller having an outer insulating layer 4 can be used as both the grounded roller and the discharge electrode roller. The outer insulating layer 4 should have a least possible thickness which is generally 0.1 to 2 mm, preferably 0.1 to 1 mm. If the thickness exceeds these values, the uniformity of the distribution of corona charge tends to decrease.

The present corona treatment apparatus is especially suitable for hydrophilizing the surface of a hydrophobic support to be coated with a thin hydrophilic layer such as a photographic layer, particularly an emulsion layer, which is required to be strictly uniform.

Typical examples of supports having a hydrophobic surface, to which the present method is adaptable, are those substrate materials, such as paper, synthetic film and metal foil, which are coated on one or both sides with polyolefins such as polyethylene, polypropylene, and ethylene-butene copolymer. The present method is adaptable also to other hydrophobic film substrates such as polyethylene terephthalate, polystyrene, and the like. The hydrophobic polymer layer may contain additives including pigments such as titanium dioxide and carbon black, dyes, whitening agents, antistatics, and the like. The hydrophobic support may have a rough surface.

Typical coating layers, which may be formed on the hydrophobic support having its surface hydrophilized by the corona treatment according to this invention, are hydrophilic colloid layers including emulsion layers of silver halides such as silver chloride, silver bromide, silver chlorobromide, and silver iodobromide, antihalation layers, and subbing layers. As examples of the hydrophilic colloids, mention may be made of gelatin, polyvinyl alcohol, polyvinylpyrrolidone, polyacrylamide, carboxymethylcellulose, hydroxyethylcellulose, polyvinyl methyl ether, methyl vinyl ethermaleic anhydride copolymers, and styrene-maleic anhydride copolymers. These layers may contain, if necessary, developing agents such as hydroquinone and 1-phenyl-3-pyrazolidone, pigments such as carbon black, titanium dioxide, silica, talc, clay, barium sulfate, zinc oxide, and rice starch, matting agents, hardeners such as formaldehyde and chrome alum, wetting agents, couplers, and silver-precipitating nuclei for the silver complex diffusion transfer process.

The coatings may be applied by various coating techniques such as dipping, air knife coating, kiss coating, bead coating, and curtain coating. Of these techniques, especially preferred are those of high speed coating such as bead coating and curtain coating. In practicing the present invention, the organic hydrophilic colloidal solutions are applied in single or multiple layers.

The invention is illustrated below in detail with reference to Examples, but the invention is not limited thereto.

EXAMPLE 1

In the corona discharge apparatus shown in FIG. 1, there was used as the grounded roller a steel roller clad with an insulating layer comprising varied amounts (as shown in Table 1) of powdered barium titanate about 5μ in average particle size, uniformly dispersed in one part by weight of "Hypalon", an insulators. A support was prepared by coating a paper substrate, 160 $g/m^2$ in basis weight, on both sides with polyethylene of 30μ in thickness. The support was allowed to move in the direction indicated by an arrow at a rate of 60 m/minute in contact with the revolving grounded roller, while being exposed to corona discharge produced at a frequency of 110 kHz and a discharge current of 1.0 A. The distance between the tip of discharge electrode and the support surface was 500μ. After the corona treatment, each sample of the polyethylene-coated supports was immersed in a liquid toner for electrophotography containing 0.5% of carbon black as toner. The distribution of charge over the support surface was evaluated by visual inspection of the toner distribution. The results obtained were as shown in Table 1.

TABLE 1

| Sample No. | Amount added of barium titanate powder | Relative permittivity of insulating layer | Corona charge distribution (grade) |
|---|---|---|---|
| 1 | 0 | 7.0 | 4 |
| 2 | 0.1 | 7.4 | 3 |
| 3 | 0.5 | 8.7 | 2 |
| 4 | 1.0 | 10.5 | 1 |
| 5 | 2.0 | 14.0 | 1 |
| 6 | 3.0 | 17.4 | 1 |

Note:
The corona charge distribution was evaluated by the four-grade rating method:
Grade 1: Excellent; no area of non-uniform charge distribution was detected.
Grade 4: Poor; non-uniform charge distribution was detected all over the surface.

From the results shown in Table 1, it is seen that the inclusion of a high-permittivity substance in the insulating layer of grounded roller results in improvement of uniformity of the corona charge distribution. It is thus possible to achieve uniform distribution of charge.

In the next series of experiment runs, the corona treatment was carried out in the same manner as described above and immediately thereafter, the corona-treated surface of the support was coated with a gelatino silver halide emulsion. Sample No. 1 showed non-uniformity of the coating all over the surface, while sample No. 2 showed locally non-uniform coating. Sample No. 3 was good, the non-uniformity of coating having been substantially inconspicuous. Samples No. 4 to No. 6 showed excellent coating.

EXAMPLE 2

In the corona apparatus shown in FIG. 1, there was used as the grounded roller a steel roller clad with an insulating layer consisting of only an insulating substance shown in Table 2. The thickness of insulating layer was 2.5 mm in all cases. The corona treatment was carried out in the same manner as in Example 1, except that the above grounded roller was used. The corona charge distribution was evaluated as in Example 1. The results obtained were as shown in Table 2.

TABLE 2

| Sample No. | Insulating substance | Relative permittivity | Corona charge distribution |
|---|---|---|---|
| 7 | Silicone rubber | 3 | 4 |
| 8 | Hypalon | 7 | 4 |
| 9 | Zr titanate porcelain | 55 | 1 |
| 10 | Ba titanate porcelain | 1500 | 1 |

It is seen from Table 2 that when a grounded roller clad with a high-permittivity substance layer was used, the uniformity of corona charge distribution on the surface of polyethylene layer of the support was improved. It was thus possible to obtain completely uniform charge distribution.

Next, the corona treatment was carried out in the same manner as described above and immediately thereafter, the corona-treated surface of the support was coated with a gelatino silver halide emulsion. Samples No. 7 and No. 8 showed non-uniformity of the coating all over the surface, whereas samples No. 9 and No. 10 showed excellent coating.

EXAMPLE 3

In the corona apparatus shown in FIG. 2, use was made of a grounded roller comprising a steel roller clad with an insulating layer, 4 mm in thickness, of "Hyalon" containing 2 parts by weight of powdered barium titanate (a high-permittivity substance) having an average particle size of about 5μ and uniformly dispersed in 1 part by weight of the "Hypalon", and further overlaid with an insulating layer of silicone rubber, 0.5 mm in thickness. The corona treatment was carried out in the same manner as in Example 1, except that the above grounded roller was used.

For comparison, the corona treatment was carried out by using the same grounded roller as used above, except that it lacked the silicone rubber overlay.

The grounded roller of the former type was successful in producing uniformly distributed charge on a support surface for an operation period extending to 8,000 hours, whereas the latter type, used for comparison, showed partial deterioration after 1,000 hours of operation and failed in producing uniformly distributed charge on the support surface.

EXAMPLE 4

In the same corona apparatus as used in Example 3, there was used a grounded roller overlaid with an insulating "Hypalon" layer, 1.0 mm in thickness, in place of the silicone rubber layer. The corona treatment was carried out in the same manner as in Example 3. Uniformly distributed charge was produced on a support for an operation period extending to about 5,000 hours.

EXAMPLE 5

The corona treatment was carried out in the same manner as in Example 4, except that the grounded roller was overlaid with an insulating layer of ethylene propylene rubber in place of the "Hypalon". Uniformly distributed charge was produced on the support for a period extending to about 4,000 hours without deterioration in the grounded roller.

EXAMPLE 6

In the corona apparatus shown in FIG. 2, there was used a grounded roller comprising a steel roller clad with an insulating layer, 2.5 mm in thickness, of barium titanate alone, and further overlaid with an insulating layer of silicone rubber, 0.5 mm in thickness. The corona treatment was carried out in the same manner as in Example 1, except that the above grounded roller was used. There was produced uniformly distributed charge on the support. The grounded roller was more resistant to a mechanical impact, as compared with a grounded roller without the silicone rubber overlay.

EXAMPLE 7

Test result similar to those of Example 6 were obtained by using the same grounded roller as used in Example 6, except that the roller was overlaid with an insulating layer of "Hypalon", 1.0 mm in thickness, in place of the silicone rubber.

What is claimed is:

1. A method for coating a hydrophilic colloid-containing layer on a web which comprises hydrophilizing a hydrophobic surface of the web by corona treating the hydrophobic surface with a corona discharge apparatus having a discharge electrode and a grounded roller, wherein the grounded roller or the discharge electrode, which is in roller form, is a metal roller clad with an insulating layer comprising a rubber which contains a powdered high-permittivity substance which has a relative permittivity of at least 20 and thereafter coating the thus hydrophilized surface of the web with a hydrophilic colloid-containing layer.

2. A method according to claim 1, wherein the particle size of the powdered high-permittivity substance is about 50μ or below.

3. A method according to claim 2, wherein the particle size is 10μ or below.

4. A method according to claim 1, wherein the amount of the high-permittivity substance in the insulating layer is about 0.3 to 3 parts by weight for 1 part by weight of the rubber.

5. A method according to claim 1, wherein the powdered high-permittivity substance is a ceramic.

6. A method according to claim 1, wherein the powdered high-permittivity substance is at least one substance selected from the group consisting of titanates and titanium oxide.

7. A method according to claim 1, wherein the high-permittivity substance is barium titanate.

8. A method according to claim 1, wherein the thickness of the insulating layer is about 1 to 10 mm.

9. A method according to claim 8, wherein the thickness of the insulating layer is 2 to 7 mm.

10. A method according to claim 1, wherein the hydrophilic colloid-containing layer is a photographic layer.

11. A method according to claim 10, wherein the hydrophobic surface is a polyolefin surface.

12. A method for coating a hydrophilic colloid-containing layer on a web which comprises hydrophilizing a hydrophobic surface with a corona discharge apparatus having a discharge electrode and a grounded roller, wherein the grounded roller or the discharge electrode, which is in roller form, is a metal roller clad with an insulating layer comprising a rubber having a relative permittivity of about 8 or below and containing a powdered high-permittivity substance which has a relative permittivity of at least 20 and thereafter coating the thus hydrophilized surface of the web with a hydrophilic colloid-containing layer.

13. A method according to claim 12, wherein the particle size of the powdered high-permittivity substance is about 50μ or below.

14. A method according to claim 13, wherein the particle size is 10μ or below.

15. A method according to claim 12, wherein the amount of the high-permittivity substance in the insulating layer is about 0.3 to 3 parts by weight per 1 part by weight of the rubber.

16. A method according to claim 12, wherein the high-permittivity substance is a ceramic.

17. A method according to claim 12 wherein the powdered high-permittivity substance is at least one substance selected from the group consisting of titanates and titanium oxide.

18. A method according to claim 12, wherein the high-permittivity substance is barium titanate.

* * * * *